Patented Dec. 1, 1942

2,303,981

UNITED STATES PATENT OFFICE 2,303,981

INSECTICIDE

Edgar C. Britton and Frank B. Smith, Midland, Mich., assignors to The Dow Chemical Company, Midland, Mich., a corporation of Michigan No Drawing. Application July 1, 1941, Serial No. 400,648

3 Claims. (Cl. 167—35)

This invention relates to insecticides, and is particularly concerned with compositions comprising stable sulphur-dithiocyanate as an active toxicant.

The metal arsenates, such as those of lead, magnesium, and calcium, have long been employed as stomach poisons for inclusion in agricultural spray materials. Residues of such toxicants deposited in and on fruit and vegetables have proven hazardous to humans to such an extent that the use of the arsenates has been appreciably curtailed. Furthermore, legislation regulating lead and arsenic residues has necessitated treatment of produce for residue removal which greatly increases the ultimate cost of pest control. In view of the foregoing, the development of new stomach poisons for insect pests becomes of increasing importance.

We have discovered that stable sulphur-dithiocyanate is an effective stomach poison and may be conveniently substituted for acid lead arsenate in agricultural spray and dust compositions. This material, while comparable in toxicity to the arsenates, has the added advantage of being compatible with such insecticidal materials as oil sprays and lime sulphur, neither of which can be satisfactorily employed with acid lead arsenate. In combinations of lime sulphur with acid lead arsenate, a composition is formed which causes severe foliage injury. Acid lead arsenate also reacts with oil emulsions to such an extent that they are rendered unstable and injurious to growing vegetation.

The stable sulphur-dithiocyanate which we propose to employ as a toxicant may be prepared essentially as described in the Journal of the American Chemical Society 60, 2614. In a representative reaction, a mixture of 194 grams of substantially anhydrous potassium thiocyanate and 540 grams of sulphur chloride was heated to its boiling temperature and under reflux for 8 hours. At the end of this time, the reaction mixture was cooled and filtered, whereby there was recovered an appreciable quantity of an amorphous residue. This residue was washed with 500 milliliters of carbon bisulphide to remove free sulphur, then boiled with 500 milliliters of water. The resulting water dispersion was filtered, and the residue washed successively with hot water and carbon bisulphide, and oven-dried at 80° C. Stable sulphur dithiocyanate was thereby obtained as an orange-yellow powder decomposing at 500°–600° C. and substantially insoluble in water and such common organic solvents as acetone, ortho-dichlorbenzene, dioxane, turpentine, glycol, carbon bisulphide, petroleum ether, isopropyl ether, nitrobenzene, and mineral oil. These characteristics make the product particularly valuable as an insecticidal toxicant and permit its use in combination with many other insecticidal toxicants and diluents which are not compatible with arsenicals. 20 parts by weight of stable sulphur dithiocyanate was mixed with 80 parts by weight of diatomaceous earth and ground in a ball mill to an approximate particle size of from 1 to 5 microns diameter. 15 pounds of this mixture was dispersed in sufficient water to obtain a composition equivalent to 3 pounds of the active toxicant in 100 gallons of spray. This composition was sprayed on potato vines heavily infested with larvae of the Colorado potato beetle and found to give a kill of 70 per cent in 3 days. Inspection of the vines 2 days after the application showed that approximately 3 per cent of the leaves were faded, scorched, or otherwise affected by the spray application. In an analogous experiment, 3 pounds of acid lead arsenate was dispersed in 100 gallons of spray and found to kill 73 per cent of the beetle larvae in 3 days. Injury resulting from this treatment amounted to 20 per cent in 2 days.

Additional foliage injury tests were carried out with various spray compositions comprising stable sulphur-dithiocyanate, acid lead arsenate, and combinations thereof with lime sulphur. Young leaves of the soya bean were employed in the determination. An aqueous spray containing 3 pounds of the dispersed thiocyanate per 100 gallons injured only 5 per cent of the soya bean foliage. Acid lead arsenate at 3 pounds per 100 gallons injured 20 per cent of the foliage. A composition of 3 pounds of stable sulphur-dithiocyanate and 16 pounds of liquid lime sulphur (32° Bé.) in 100 gallons of water injured only 5 per cent of the soya bean foliage. The combination of 16 pounds of the liquid lime sulphur and 3 pounds of acid lead arsenate in 100 gallons of spray material injured 30 per cent of the leaves contacted therewith.

While the foregoing examples disclose stable sulphur-dithiocyanate dispersed in water and in combination with an excess of diatomaceous earth, our new insecticidal toxicant may be compounded in various other ways to obtain compositions valuable as agricultural insecticides. For example, the stable sulphur-dithiocyanate may be used in conjunction with common oil-water emulsion compositions, or may be dispersed with an excess of an inert carrier and employed as a dusting material for the control of chewing insects. Likewise, the stable sulphur-dithiocyanate may be substituted for common poisons in the preparation of grasshopper bait, by mixing with bran and molasses, as is common in the art. If desired, any of the compositions as set forth above may be further modified by the inclusion therein of various wetting, sticking, and dispersing agents, or by mixture with inorganic pigments and organic dyes.

The stable sulphur-dithiocyanate with which the present invention is concerned appears to be substantially non-toxic to humans and higher forms of animal life, and non-corrosive to skin and tissue.

Other modes of applying the principle of our invention may be employed instead of those explained, change being made as regards the materials or the amounts thereof employed, provided the compositions defined by any of the following claims or their equivalent be obtained.

We therefore particularly point out and distinctly claim as our invention:

1. An insecticidal composition comprising as an active toxicant stable sulphur-dithiocyanate.

2. An insecticidal spray comprising an aqueous dispersion of stable sulphur-dithiocyanate.

3. An insecticidal composition comprising an intimate mixture of diatomaceous earth and stable sulphur-dithiocyanate.

EDGAR C. BRITTON.
FRANK B. SMITH.